(12) United States Patent
van der Knaap

(10) Patent No.: US 7,611,152 B2
(45) Date of Patent: Nov. 3, 2009

(54) ACTIVE CHASSIS OF A VEHICLE

(75) Inventor: Albertus Clemens Maria van der Knaap, Helmond (NL)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 239 days.

(21) Appl. No.: 11/655,149

(22) Filed: Jan. 19, 2007

(65) Prior Publication Data

US 2007/0170680 A1 Jul. 26, 2007

(30) Foreign Application Priority Data

Jan. 21, 2006 (DE) .................... 10 2006 002 983

(51) Int. Cl.
*B60G 21/06* (2006.01)
(52) U.S. Cl. .......... 280/5.507; 280/5.508; 280/124.106; 280/124.16; 280/124.161
(58) Field of Classification Search ................
280/124.157–124.161, 5.5, 124.104, 124.105, 280/124.125, 5.504, 5.506–5.508, 5.512, 280/5.513, 535, 5.515, 5.514, 124.106, 124.124
See application file for complete search history.

(56) References Cited

U.S. PATENT DOCUMENTS

| | | | |
|---|---|---|---|
| 5,862,894 A | 1/1999 | Boichot et al. | |
| 6,039,326 A * | 3/2000 | Agner | 280/5.506 |
| 6,394,238 B1 * | 5/2002 | Rogala | 188/266.2 |
| 6,669,216 B1 * | 12/2003 | Elser et al. | 280/124.106 |
| 7,240,906 B2 * | 7/2007 | Klees | 280/5.502 |

(Continued)

FOREIGN PATENT DOCUMENTS

DE 195 21 747 A1 12/1996

(Continued)

OTHER PUBLICATIONS

Albert Van Der Knaap et al., Active Running Gear System for Motor Vehicle has Hydraulic Piston-Cylinder Unit, Delivery Pump that Draws Hydraulic Medium from Pressure Regulating Valve Output, at least at known operating points, Publication Date: Oct. 23, 2003, Patent No. DE10216132, Machine translation of Description.*

(Continued)

*Primary Examiner*—Ruth Ilan
*Assistant Examiner*—James English
(74) *Attorney, Agent, or Firm*—Crowell & Moring LLP

(57) ABSTRACT

An active chassis system of a motor vehicle having two axles with two wheels each. Each wheel is supported via a spring element and a hydraulic piston-cylinder unit acting as a damper and as a hydraulic actuator for introducing additional force between the wheel and the body. Each of the working chambers of the actuator is supplied with hydraulic pressure from a delivery pump. The working chambers of actuators of an axle having smaller cross-sectional area are connected directly to one another, and a directional valve is used for roll control. The directional valve is a pilot-operated directional valve whose control pressure is tapped in parallel with a controllable throttle. The throttle is connected between the working chambers having larger cross-sectional area of the axle's two actuators, and adjusts the pressure drop between the working chambers, depending on the direction of rotation and/or the output of the delivery pump.

14 Claims, 3 Drawing Sheets

U.S. PATENT DOCUMENTS

| | | | |
|---|---|---|---|
| 7,357,395 B2 * | 4/2008 | Brandenburger | 280/5.514 |
| 2003/0047898 A1 * | 3/2003 | Nagy et al. | 280/124.157 |
| 2006/0119064 A1 * | 6/2006 | Mizuno et al. | 280/124.157 |

FOREIGN PATENT DOCUMENTS

| | | |
|---|---|---|
| DE | 198 44 493 A1 | 3/2000 |
| DE | 697 03 567 T2 | 6/2001 |
| DE | 101 11 551 A1 | 9/2002 |
| DE | 102 16 132 A1 | 10/2003 |
| DE | 10 2004 037 975 A1 | 11/2005 |
| EP | 1 238 834 B1 | 9/2002 |

OTHER PUBLICATIONS

Dr. Dieter Konik et al., Combined Roll Stabilization and Leveling System for Vehicle Chassis, Publication Date: Dec. 19, 1996, Patent No. DE19521747, Machine translation of Description.*

German Search Report dated Oct. 13, 2006 including English translation (Nine (9) pages).

* cited by examiner

ACTIVE CHASSIS OF A VEHICLE

This application claims the priority of DE 10 2006 002 983.6, filed Jan. 21, 2006, the disclosure of which is expressly incorporated by reference herein.

BACKGROUND AND SUMMARY OF THE INVENTION

The invention relates to an active chassis system of a vehicle, in particular a passenger vehicle having two axles with two wheels each, whereby each vehicle wheel is supported on the vehicle body via a spring element and a hydraulic piston-cylinder unit acting as a damper and as a hydraulic actuator. The hydraulic piston-cylinder unit serves to introduce an additional force between the wheel and the body, whereby a hydraulic supply line is assigned to each of the working chambers of the actuator provided in the cylinder of the piston-cylinder unit on both sides of the piston, their cross-sectional areas differing from one another, such that these hydraulic supply lines serve to supply the respective working chamber with hydraulic pressure provided by a delivery pump via the respective working chamber. The working chambers of two actuators of one vehicle axle are connected hydraulically directly to one another with the smaller cross-sectional area in each case, and a directional valve is used for the roll control mode of operation.

Reference is made to German Patent Application DE 101 11 551 A1 for the known state of the art.

An active chassis system according to the present invention is fundamentally characterized by many degrees of freedom with regard to controllability, in particular also the positioning of the vehicle body with respect to the vehicle wheels. As indicated in German Patent Application 101 11 551 A1 cited above, an essentially known so-called roll stabilization as well as a level regulation of the vehicle body can then be implemented. It is advantageous from an energy standpoint if a spring element is connected in parallel with each actuator.

The object of the present invention is to provide an active chassis system which has a simpler design with improved function and is inexpensive to manufacture.

The object is achieved according to this invention with the features of claim 1. Additional embodiments of the invention are derived from the dependent claims.

According to this invention, an active chassis system of a vehicle, in particular a passenger vehicle having two axles with two wheels each, where each vehicle wheel is supported on the vehicle body via a spring element and a hydraulic piston-cylinder unit functioning as an actuator, and a hydraulic supply line is assigned to the working chambers of each actuator provided on both sides of the piston in the cylinder of the piston-cylinder unit, their cross-sectional areas differing from one another, the respective working chamber being supplied with hydraulic pressure provided by a delivery pump via the hydraulic supply line, whereby the working chambers of two actuators of a vehicle axle with the smaller cross-sectional area in each case are hydraulically connected directly to one another, and a directional valve is used for the roll control mode of operation, characterized in that the directional valve is a pilot-operated directional valve whose control pressure is tapped in parallel with a controllable throttle which is connected hydraulically between the two working chambers having the larger cross-sectional area of the two actuators of a vehicle axle and by means of which a pressure drop between the working chambers, which depends on the direction of rotation and/or the delivery output of the delivery pump, is adjustable.

This is a simple system that is inexpensive to manufacture and allows both roll control and level control as well as damping of lifting vibrations with a few components in a hydraulic circuit having a simple design. Flow can pass through the controllable throttle in two different directions, which has the effect that in comparison with the state of the art, the delivery pump can also be shut down if there is no transverse acceleration, e.g., when driving straight ahead. The controllable throttle has a good interference behavior with degressive characterization because pressure fluctuations are minimized. In addition, with a good design of the engine characteristics map and regulation of the throttle, the operating point of the delivery pump can always be kept at the nominal power. In the event of failure of the system, with no power, the front axle advantageously has a hard adjustment and the rear axle has a soft adjustment. The pilot-operated directional valve advantageously has a good response characteristic. The effect of using pilot operation is that no technical regulating complexity is required to switch the directional valve. The position of the directional valve is determined by the pressure drop on the controllable throttle, which in turn depends on the direction of rotation and the volume flow through the delivery pump, in addition to being induced by the resistance of the controllable throttle and the volume flow which is induced by rolling.

An advantageous embodiment of the invention is characterized in that the directional valve for roll control switches to one of its two end positions, while ensuring free spring deflection and rebound of the individual wheels in its middle position by means of an H circuit that equalizes the pressure between the four working chambers of the actuators of a vehicle axle. It is advantageous here if the directional valve is a 4/3-way valve or a 4/2-way valve, in particular with the end position.

A preferred embodiment of the invention is characterized in that the delivery pump withdraws the hydraulic medium for the level control operating mode from a tank or operates in a closed circuit for the roll damping operating mode and the mode of damping of lifting vibrations, said closed circuit having an equalizing volume, whereby a 3/2-way valve is connected to the hydraulic circuit, acting as the reversing valve between the closed circuit and the tank withdrawal in parallel with the controllable throttle and in series with the delivery pump.

It has been recognized that the entire hydraulic system can be "prestressed" so to speak for a cohesive operating time by connecting a hydraulic line, which functions more or less as the return flow line with respect to the working chamber of an actuator that is acted upon by a lower hydraulic pressure, to the intake side of the delivery pump. The hydraulic medium, which already has a certain pressure level (and is no longer pressureless as it comes from the tank) is thus made available to the delivery pump at the intake end, thereby reducing the pressure difference that must be generated by the delivery pump for supplying the desired maximum pressure.

Presupposing an adequate imperviousness of the hydraulic system, there is a return flow of hydraulic medium into a hydraulic tank with a hydraulic circuit like that described so far practically only when the vehicle body is to be lowered, i.e., its level is to be reduced or when the load on the vehicle body is to be reduced. Apart from special boundary conditions or operating conditions, the delivery pump need only deliver enough hydraulic medium (in addition) from a tank (such as the aforementioned tank) into the hydraulic circuit of the active chassis system—assuming an adequate imperviousness of the system as a whole—until reaching the desired level of the vehicle body with respect to the vehicle. wheels and ensuring a sufficiently high hydraulic pressure in the system. Then the 3/2- way valve connected in series with the delivery pump can be switched, after which the delivery pump operates in a closed hydraulic circuit, uncoupled from the hydraulic tank.

In addition, in the active chassis system, an equalizing volume may also be provided as a pressure accumulator, among other reasons so as to prevent cavitation phenomena in the hydraulic system. If, depending on the position of the directional valve in roll control, at least one of the working chambers of the actuators having the larger cross-sectional area is connected to the pressure accumulator that is acted upon with a certain minimum pressure, then the cavitation phenomena in the actuator working chambers can be prevented for all relevant forms of excitation. The pressure accumulator here preferably receives the hydraulic medium from the (adjustment) throttle outlet of the low-pressure side because the pressure level prevailing here is adequate with the prestressed hydraulic system according to this invention, i.e., when the (adjustment) throttle outlet of the low-pressure side is connected to the intake side of the delivery pump (and not to the tank for the hydraulic medium).

Such an equalizing volume, however, also has other advantages, e.g., for a passenger vehicle having two axles each having two wheels. First, the entire hydraulic system can be definitely improved, i.e., "prestressed" in this way so that the delivery pump then need provide only a sufficient hydraulic pressure to perform a roll stabilization. Furthermore, the equalizing volume may function as an intermediate buffer in the case of bilateral spring support of the vehicle body so a relatively soft lift spring rate can easily be achieved-if desired. Finally, such an equalizing volume is also helpful to achieve an essentially constant vibration-inherent frequency of the vehicle body regardless of different loads and thus varying weights of the body. A so-called minimal pressure in the hydraulic system and thus also in the pressure accumulator can thus be established and thus also it can be established in the pressure memory device that the vibration-inherent frequency of the vehicle body is essentially independent of the respective weight of the body.

Therefore, according to an advantageous embodiment of the invention, the equalizing volume is designed as a pressure accumulator and minimal pressure in the pressure accumulator is adjusted so that the vibration-inherent frequency of the vehicle body is essentially unchanged with different weights of the body, in particular resulting from a different load on the body.

For spring deflection on both sides, an especially advantageous embodiment of the invention is characterized in that a 4/2- way valve is connected in series as the lifting valve between the directional valve and the hydraulic supply line of the working chambers of the actuators with the smaller cross-sectional area and/or equalizing volumes, said lifting valve supporting the lifting vibrations and a nonreturn valve that blocks the flow for the directional valve is connected in parallel for its passage to the hydraulic supply line of the working chambers, and for its passage to the equalizing volume, another valve return valve that blocks the flow thereto is connected in parallel.

According to another preferred embodiment of the invention, each working chamber of an actuator is connected in series to the respective hydraulic supply line via a throttle or an adjusting throttle, whereby this is bridged in parallel by a nonreturn valve that blocks the passage in the direction of the supply line.

Thus it is possible to prevent cavitation phenomena, in particular in the working chambers which are constantly exposed to the higher hydraulic pressure and which have a smaller cross-sectional area than the other actuator working chambers, even with extreme piston movements (i.e., with high rates of spring deflection and rebound of the active chassis system). This increases the functional reliability and the perceptible driving comfort of the active hydraulic chassis system.

According to additional advantageous embodiments of the invention, at least the directional valve and the controllable throttle are combined to form a first joint valve block. In addition, this valve block may also include the lifting valve with its nonreturn valves if necessary. A second valve block may then advantageously comprise at least the reversing valve, the delivery pump and its drive.

An active chassis system for both axles, e.g., of a passenger vehicle having a simpler design with improved function and being more economically manufacturable can then be characterized advantageously in that it comprises a first valve block for each axle, whereby a single second valve block is provided, comprising one reversing valve and one delivery pump per axle, and the drive for all the delivery pumps is provided by a single drive motor.

When the flow channels and control edges of the directional valve are designed and positioned in relation to one another so that the opened flow-through area is constant at least at the valve inlet, this also has the advantage that operation of the directional valve does not affect driving comfort because the total flow cross section remains constant regardless of the position while the final position damping of the directional valve ensures better acoustics.

Two preferred exemplary embodiments of the invention are depicted in greater detail in the following description and in the respective drawing. The same reference numerals are used for the same elements in the figures.

Other objects, advantages and novel features of the present invention will become apparent from the following detailed description of the invention when considered in conjunction with the accompanying drawings.

DETAILED DESCRIPTION

Figure 1:
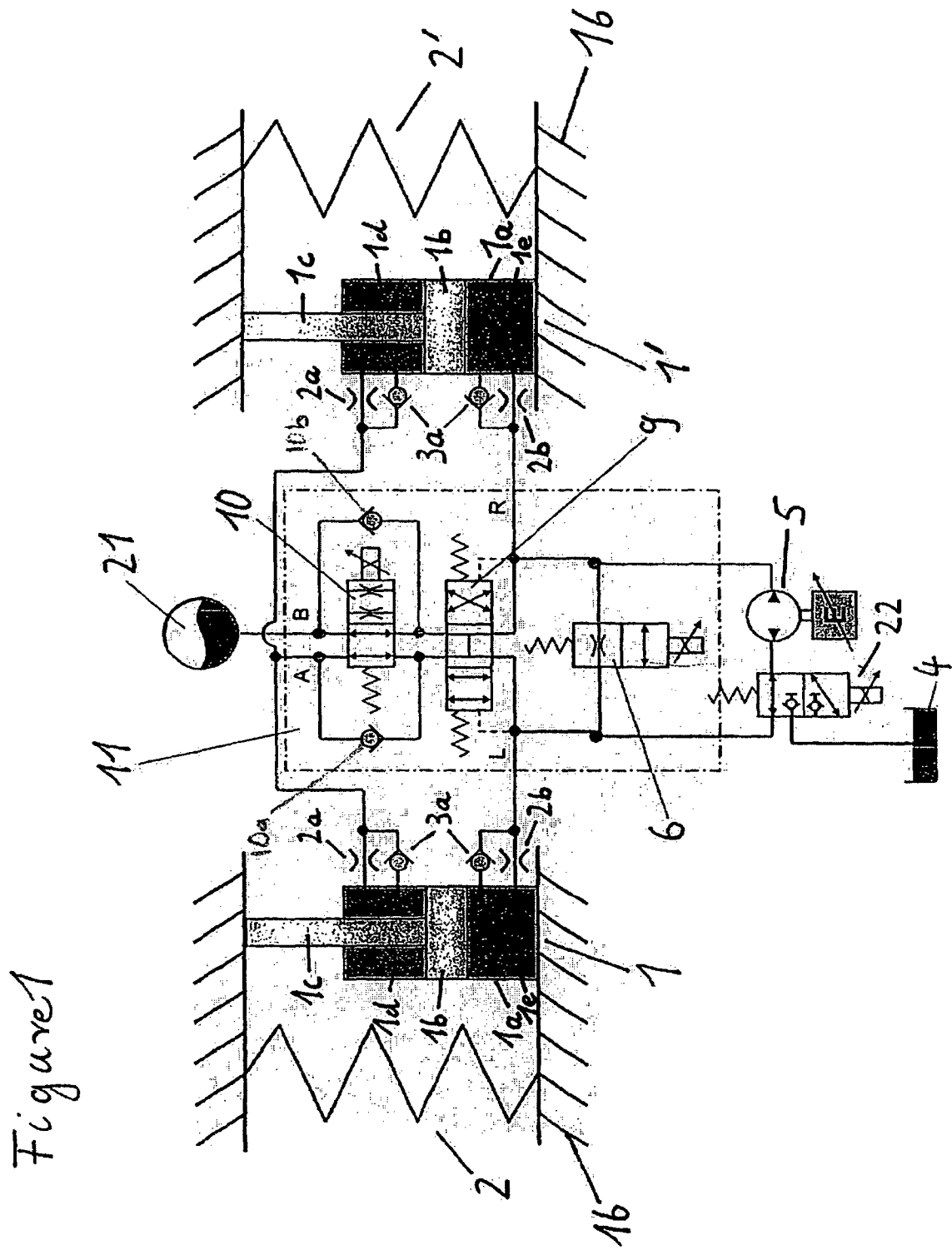
FIG. 1 shows a schematic basic diagram with the hydraulic circuit of an inventive active chassis system of a vehicle for one vehicle axle in accordance with am embodiment of the present invention.

An actuator 1 or 1', which simultaneously acts as a damper, is assigned to the left wheel (not shown) of a vehicle axle (not shown) and the right wheel (also not shown) of this vehicle axle. A traditional spring element 2, 2' is connected in parallel to each actuator 1, 1' so that each vehicle wheel is supported on the vehicle body 16 (depicted only symbolically) via this spring element and the respective actuator 1 and/or 1'.

Essentially each actuator 1, 1' consists of a hydraulic cylinder 1a and a piston 1b guided longitudinally displaceably essentially in the vertical direction (based on the installed state in the vehicle), the piston rod 1c of said piston being connected to the vehicle wheel and/or a vehicle guide element, while the vehicle body 16 is mounted on the actuator cylinder 1*a*. (An inverted installation of the actuator is also possible.) Each actuator 1, 1' has two working chambers 1*d*, 1*e*, whereby here the working chamber 1*d* above the piston 1*b* is facing the respective vehicle wheel of the vehicle and the working chamber 1*e* beneath the piston 1*b* is facing the body 16. Because of the piston rod 1*c*, the upper actuator chamber 1*d* here has a smaller cross-sectional area than the other actuator chamber, namely the lower actuator chamber 1*e* here. It is especially advantageous if the size ratio of the aforementioned cross-sectional areas of the actuator chambers 1*d* and 1*e* is on the order of magnitude of 1:2.

Each actuator working chamber 1*d*, 1*e* of each actuator 1, 1' is assigned its own hydraulic supply line, whereby these hydraulic lines over which of course not only is hydraulic medium supplied to the working chambers but also hydraulic medium can be removed from them, do not fundamentally have any reference numerals but instead are referred to below by their end connection points. Moreover it may be sufficient if a certain additional pressure is introduced into the respective actuator working chamber via the supply lines because in this way the actuator can already initiate an additional force between the body 16 and the respective vehicle wheel so that a rolling moment in particular can thereby be introduced into the vehicle body and therefore a rolling movement of the vehicle body can be counteracted. In this regard, a suitable introduction of force into the chassis system is accomplished via an actuator 1 and/or 1' that is controlled in a suitable manner, whereby the vehicle body 16 and thus also the respective actuator piston 1*b* are practically not moved, at any rate under the prerequisite of a flat road surface without any excitation due to unevenness in the road surface.

An arrangement 11 for supplying the actuator working chambers 1*d*, 1*e* of the actuators 1, 1' with hydraulic medium in the desired manner is present such that level control and/or roll stabilization and/or a lift regulation of the vehicle body 16 can be implemented. Components of this hydraulic arrangement 11 include, in addition to the hydraulic supply lines, several valves 6, 9, 10 to be explained in greater detail below. In addition, a tank 4 for the hydraulic medium is connected upstream from the hydraulic supply arrangement 11; hydraulic medium is delivered from this tank to the hydraulic system by a pump 5 driven by the vehicle drive engine, for example, or (preferably) by a regulable electric motor (labeled here with the letter E with an arrow).

As can be seen, all the actuator working chambers 1*d*, 1*e* of the two actuators 1, 1' are supplied with hydraulic medium practically directly by the pump 5 when a directional valve 9 which is provided in the hydraulic supply arrangement 11 is in the middle position of an H circuit illustrated in the figure which ensures free spring deflection and rebound of the individual wheels. However, in any other position of the directional valve 9, the hydraulic supply lines to the actuator working chambers 1*d*, 1*e* are wired in such a way that rolling is dampened. The directional valve 9 is a pilot-operated 4/3-way valve and, as already mentioned, it has a pressure-equalizing H circuit between the four working chambers 1*d*, 1*e* of the actuators 1, 1' of a vehicle axle that ensures free spring deflection and rebound of the individual wheels in its middle position. For damping of rolling, the directional valve 9 switches to one of its two end positions with end position damping, automatically controlled by the drop in pressure of the volume flow supplied by the delivery pump 5 to the controllable throttle 6, i.e., actively switched via the direction of rotation of the delivery pump 5.

Depending on the switch position of the directional valve 9, one actuator chamber 1*e* of actuators 1, 1' is connected to an equalizing volume 21 in the roll control mode of operation, while the other actuator chamber 1*e* is then connected to the two other actuator chambers 1*d* of the actuators 1, 1' and vice versa. The equalizing volume 21 is designed as a pressure accumulator and the minimal pressure in the pressure accumulator is adjusted so that the vibrational inherent frequency of the vehicle body 16 is essentially unchanged with a different body weight, in particular resulting from a different load on the body 16.

The control pressure of the directional valve 9 is tapped in parallel with the controllable throttle 6, which is switched hydraulically between the two working chambers 1*e* with the larger cross-sectional area of the two actuators 1, 1' of a vehicle axle and by means of which a pressure drop between the working chambers 1*d*, 1*e*, which depends on the direction of rotation of the delivery pump 5, is adjustable. The controllable throttle 6, which may be designed as an adjusting throttle, for example, can be controlled in a targeted manner, to which end pressure sensors 18 (FIG. 2) are also connected to the hydraulic supply arrangement 11. The electric motor E driving the pump 5 can also be controlled suitably to process their signals. An electronic control unit (not shown) is provided for this purpose. Essentially, the hydraulic supply arrangement 11 having the valves mentioned above as used here but not obligatorily required may be a so-called valve block.

The letters A, B, L, R refer to the tapping points of the hydraulic supply arrangement 11, either the pump pressure P or the pressure of the equalizing volume 21 being alternately applied at the tapping points L and R in the roll control mode of operation, depending on the position of the directional valve 9, while the working chambers 1*d* of the two actuators 1, 1' that are interconnected hydraulically are always supplied with pump pressure P from the tapping point A. The hydraulic pressure applied to the lower working chamber 1*e* of the left actuator 1 is tapped at the tapping point L of the supply arrangement 11, while the hydraulic pressure which is relayed to the lower working chamber 1*e* of the right actuator 1' is applied to the tapping point R of the hydraulic supply arrangement 11. The two tapping points R, L are connected to the delivery pump 5 in such a way that they are connected to the delivery pump inlet or to the delivery pump outlet, each alternately depending upon the direction of rotation of the delivery pump 5.

With regard to the supply of hydraulic medium to the pump 5, a switching valve 22 which is provided in series with the pump 5 and by means of which the pump 5 can be connected optionally either to the tank 4 for the hydraulic medium or the hydraulic circuit can be connected.

The switching valve 22 may therefore be "prestressed," so to speak, in series with the pump 5 and the entire hydraulic circuit can be prestressed by the switching valve. In the position of the switching valve 22 not shown here, the pump 5 is acted upon by the so-called level function (alone or by the level function in conjunction with a roll stabilization function), whereby for equalizing the rod volumes of the piston rods 1*c* to be displaced outward, the pump 5 delivers a quantity of hydraulic medium corresponding to these rod volumes into the lower working chambers 1*e* of the actuators 1, 1' until the automotive body 16 has reached a desired height with respect to the assigned vehicle wheels (and/or has achieved a desired roll stabilization moment). However if the switching valve 22 assumes the position illustrated in the figure, the pump 5 is only under the load of a roll stabilization and consequently need only apply the required roll stabilizing pressure. For the roll stabilization function, practically no additional hydraulic medium need be conducted into the working chambers of the actuators—as already explained above—but instead (preferably) only the pressure in the upper working chambers 1d of the two actuators 1, 1' is suitably increased and case by case, depending on the desired direction of the rolling moment, the pressure in the lower working chamber 1e of the one of the two actuators 1 or 1' is increased suitably. However, no additional hydraulic medium need be delivered from the tank 4 into the hydraulic circuit for performing this function but instead the equalizing volume 21 may be connected to the output of the controllable throttle 6, where a certain level pressure or so-called minimal pressure prevails. If the switching valve 22 is in the position depicted here—as already explained above—namely a prestressed hydraulic circuit prevails, so to speak, and this is characterized by certain energy advantages, as also already explained above.

However, such a prestressed hydraulic pressure circuit is also advantageous from the standpoint of preventing cavitation phenomena, which is further improved in particular by the equalizing volume 21 as an additional pressure accumulator. Such a pressure accumulator, which is under the load of a certain minimal pressure, is connected to the tapping point B of the hydraulic supply device 11.

The valves provided on or near the actuators 1, 1' are discussed below. A passive or, alternatively, a regulable damper valve 2a and/or 2b, which is referred to as a throttle and/or an adjusting throttle, is arranged in series with the actuator working chamber 1d, 1e in each hydraulic supply line close to the respective actuator working chamber 1d, 1e (preferably mounted on the wall of the actuator cylinder 1a), so that the actuator 1 can simultaneously act extremely effectively as a damper. The desired damper effect is then created in particular by the flow of hydraulic medium through these damper valves 2a, 2b. The damper valves 2a, 2b may have different damping properties as a function of the direction of flow of the hydraulic medium. With passive damper valves, an essentially constant damper rate can be achieved, whereas with (electronically) regulable damper valves, the desired damper rate can be adjusted in a targeted manner. Then there are practically no restrictions so that any desired damping characteristic can be regulated.

At this point, the special wiring of these damper valves 2a, 2b should also be mentioned in conjunction with the nonreturn valves 3a and the lines containing these nonreturn valves 3a. With this proposed wiring so that the damper valves 2a, 2b are each bridged in parallel by a nonreturn valve 3a that blocks the flow in the direction of the supply line, namely with regard to the damper function of the actuators 1, 1', the so-called intake stage and the pressure stage of the damper can be designed and regulated independently of one another.

It has been found that when the active supply of hydraulic medium into an actuator working chamber 1d and/or 1e is greatly throttled and when at the same time the hydraulic pressure prevailing in this working chamber is relatively low, then the hydraulic medium in the respective working chamber easily begins to foam and cavitate under the influence of the rapidly fluctuating excitation from irregularities in the road surface. The result of this might be an unstable hydraulic medium in the working chamber(s), so that the actuator 1 and/or 1' would behave like a spring. This can lead to reduced damper function of the actuator, so that then reliable contact between the wheels and the road surface would no longer be guaranteed.

This is prevented by the directional valve 9 in that it switches in the case of a rapidly fluctuating excitation in such a way that the actuator working chamber that is at risk of cavitation is connected to the pressure accumulator 21 as a so-called minimal pressure supply source.

For bilateral lift regulation, a 4/2-way valve is connected in series as the lifting valve 10 that the lifting vibrations between the directional valve 9 and the hydraulic supply lines of the working chambers 1d with the respective smaller cross-sectional area and/or the equalizing volume 21. It can operate passively or as a regulated system. Nonreturn valves 10a, 10b are connected in parallel with each passage of this lifting valve 10, namely for its passage to the hydraulic supply line of the working chambers 1d, a nonreturn valve 10a blocking the flow to the directional valve 9 and another nonreturn valve 10b blocking the flow to the equalizing volume 21. The hydraulic supply arrangement 11 with the lifting valve 10 and its nonreturn valves 10a, 10b with the directional valve 9 and with the controllable throttle 6 is combined in a first joint valve block with tapping points A, B, L and R.

Figure 2:
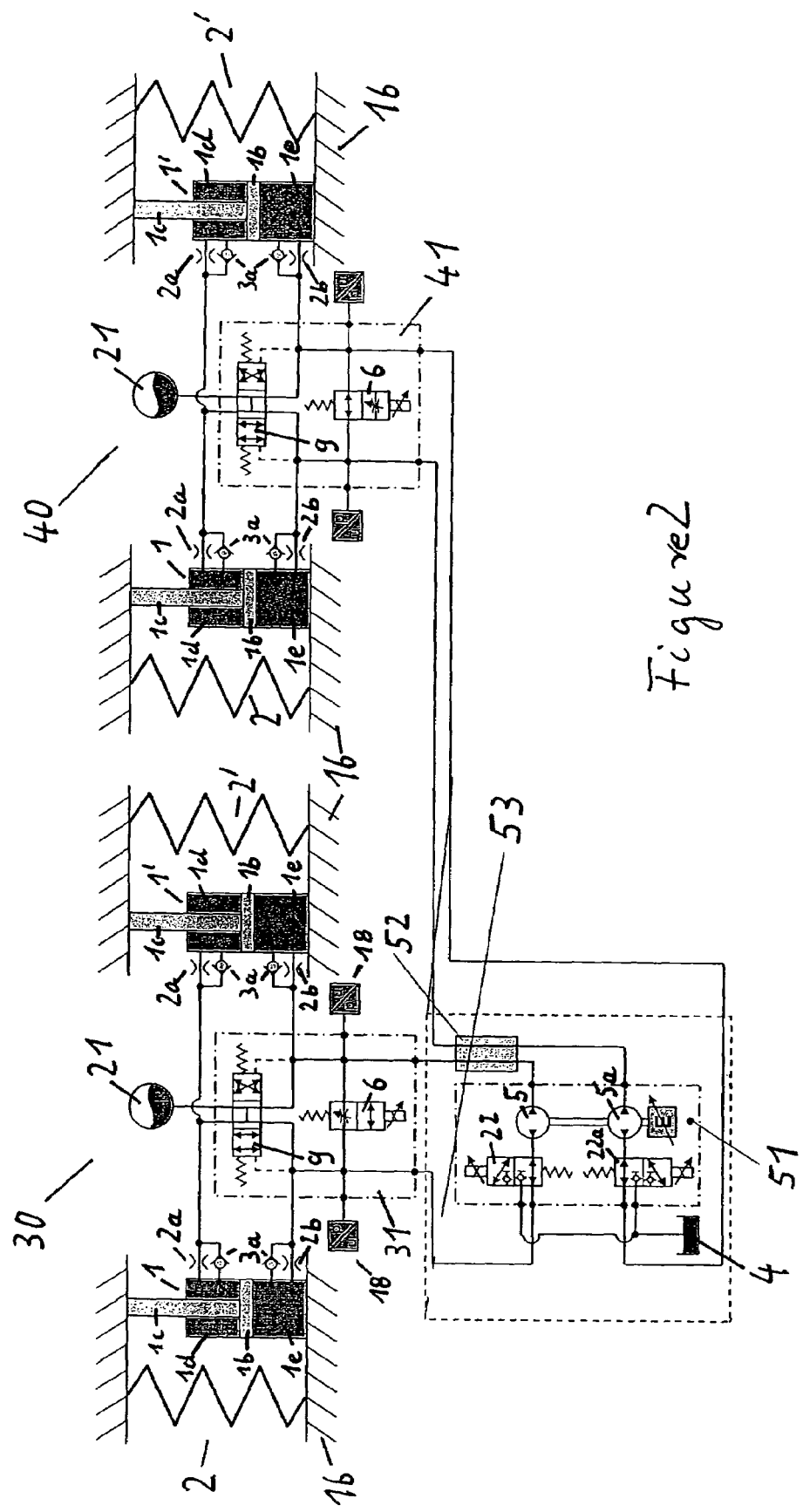
FIG. 2 shows a schematic basic diagram with the hydraulic circuit diagram of another inventive active chassis system of a vehicle for two vehicle axles with another embodiment of the invention.

FIG. 2 shows a hydraulic circuit diagram of an active chassis system for two vehicle axles. The individual modules which correspond to those in FIG. 1 are labeled with the same reference numerals and are not explained separately since they have the same function. The description of FIG. 1 should be used for this explanation. Furthermore, FIG. 2 does not show a lifting valve 10. The function of the lifting valve 10 is taken over here by a corresponding design of the damper valves 2a, 2b and the hydraulic lines.

The active chassis system of FIG. 2 has two actuators 1, 1' for the wheels of the front axle 30 and those of the rear axle 40. The actuators 1, 1' corresponding to those in FIG. 1 are controlled for each axle 30, 40 by a first valve block 31, 41 for roll damping, to which end each first valve block 31, 41 includes a directional valve 9 and a controllable throttle 6 according to the explanations of FIG. 1. To supply the two first valve blocks 31, 41 with hydraulic medium, the second valve block 51 (shown with a dash-dot outline) is provided, comprising the switching valve 22, 22a and one delivery pump 5, 5a per axle 30, 40, whereby the drive of the two delivery pumps 5, 5a is provided by a single regulable drive motor E. The two delivery pumps 5, 5a are capable of delivering hydraulic medium in both directions and can therefore be connected via the reversing valves 22, 22a to a common tank 4. A cooler 52 for the hydraulic medium is connected between the first valve blocks 31, 41 and the second valve block 51. A single modular unit, a motor-pump unit 53 comprising the second valve block 51, the tank 4 and the cooler 52 is shown with a dotted outline.

Figure 3:
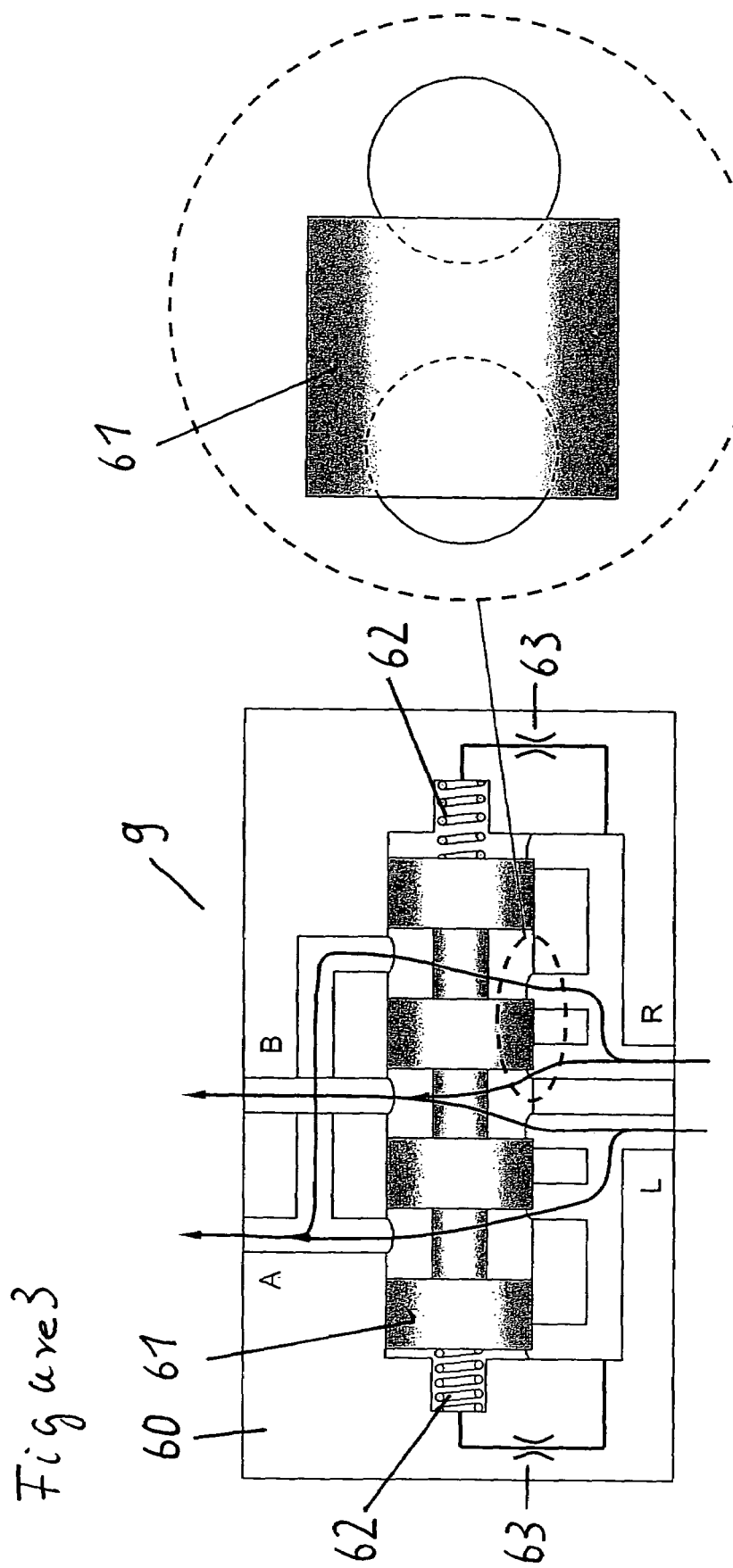
FIG. 3 shows a basic diagram of a directional valve shown in a simplified form for an active chassis system of a vehicle according to the present invention.

FIG. 3 shows a basic diagram of a directional valve 9, illustrated in a simplified form for the active chassis system. A central slide valve 61 with control edges is displaceably mounted in a valve housing 60 so that it is displaceable against the restoring force of centering springs 62. The directional valve 9 is a 4/3-way valve with fixed end position damping 63 whose control pressure is tapped in parallel with the controllable throttle 6 (FIGS. 1, 2). The central slide valve 61 is dimensioned and positioned with respect to the flow-through channels in such a way that the control edges of the central slide valve 61 keep the opened flow-through area constant at the valve inlet, the tapping points L and R, in the displacement of the central slide valve 61. As illustrated here in the circle shown with dotted lines as a detail, a full circular cross section of the flow-through channel always remains open at the tapping point R, regardless of how the central slide valve 61 is displaced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An active chassis system of a motor vehicle having two axles with two wheels each, comprising:
a plurality of spring elements, each spring element arranged between a body of the vehicle and one of the wheels;
a plurality of hydraulic piston-cylinder actuators, each hydraulic piston-cylinder actuator arranged between the body of the vehicle and one of the wheels;
a pilot-operated directional valve for each axle for control of vehicle roll motion, said directional valve hydraulically communicating with the hydraulic piston-cylinder actuators of its axle; and
a controllable throttle for each axle connected in parallel with control pressure ports of the directional valve of its axle,
wherein
each of the hydraulic piston-cylinder actuators has a piston located within a cylinder of the piston-cylinder actuator which divides the cylinder into working chambers having different cross-sectional areas,
a hydraulic supply line is assigned to each working chamber of each of the two actuators of each axle to convey hydraulic pressure provided by a delivery pump for each axle,
the working chambers of the two actuators of each axle having smaller cross-sectional areas are hydraulically connected to one another,
the controllable throttle of each axle is connected hydraulically between the working chambers of the two actuators of its axle having larger cross-sectional areas, and
the controllable throttle of each axle is arranged to permit adjustment of a pressure drop, which depends on at least one of a direction of rotation and a delivery output of its axle's delivery pump, between its hydraulically connected working chambers.

2. The active chassis system as claimed in claim 1, wherein the directional valve switches to one of two end positions for roll control, and
a pressure-equalizing hydraulic circuit between the four working chambers of the two actuators of each axle permits free spring deflection and rebound of the individual wheels of each axle.

3. The active chassis system as claimed in claim 2, wherein each directional valve is a 4/3-way valve or 4/2-way valve having end position damping.

4. The active chassis system as claimed in claim 3, wherein each delivery pump is arranged to receive hydraulic medium for a vehicle level regulation mode of operation from a tank or for roll control and damping of lifting vibrations operating modes from a closed circuit for each axle, and
each said closed circuit has an equalizing volume and a 3/2-way reversing valve which is connected in parallel with the controllable throttle for its respective axle and in series with the delivery pump for its respective axle, said reversing valve connecting its delivery pump to its closed circuit or the tank.

5. The active chassis system as claimed in claim 4, wherein each working chamber of each actuator is connected to its respective hydraulic supply line in series via a throttle or an adjusting throttle, and
each throttle or adjusting throttle is bridged in parallel by a working chamber nonreturn valve blocking the flow in the direction from the working chamber to the supply line.

6. The active chassis system as claimed in claim 5, wherein the equalizing volume of each axle is a pressure accumulator and the minimal pressure in each pressure accumulator is adjustable to permit a vibration-inherent frequency of the vehicle body to be essentially unchanged at different weights of the body.

7. The active chassis system as claimed in claim 6, further comprising:
a 4/2-way lifting valve for each axle connected in series between the directional valve of its respective axle and the hydraulic supply lines of the working chambers of the actuators of its axle with the smaller cross-sectional area and connected to the equalizing volume of its axle, wherein
said 4/2-way lifting valve is arranged to permit damping of lifting vibrations, and
a first lifting valve nonreturn valve, blocking flow to the directional valve from the hydraulic supply lines of the working chambers of the actuators of its axle with the smaller cross-sectional area, is connected in parallel to the 4/2-way lifting valve, and a second lifting valve nonreturn valve, blocking flow from the directional valve to the equalizing volume, is connected in parallel to the 4/2-way lifting valve.

8. The active chassis system as claimed in claim 7, wherein for each axle at least the directional valve and the controllable throttle are arranged in a first common valve block.

9. The active chassis system as claimed in claim 7, wherein for each axle at least the directional valve, the controllable throttle, the lifting valve and the lifting valve nonreturn valves are arranged to form a first joint valve block.

10. The active chassis system as claimed in claim 8, wherein
a second valve block includes at least its axle's reversing valve, delivery pump and a drive for driving the delivery pump.

11. The active chassis system as claimed in claim 9, wherein
a second valve block includes at least its axle's reversing valve, delivery pump and a drive for driving the delivery pump.

12. The active chassis system as claimed in claim 8, wherein
a single second valve block includes at least the reversing valves and delivery pumps for both axles, and a single drive for driving the delivery pumps.

13. The active chassis system as claimed in claim 9, wherein
a single second valve block includes at least the reversing valves and delivery pumps for both axles, and a single drive for driving the delivery pumps.

14. The active chassis system as claimed in claim 1, wherein flow channels and control edges of the directional valve are arranged relative to one another so that an opened flow-through area is constant at least at the valve inlet as a central slide valve controlling flow through the directional valve is displaced within the valve.

* * * * *